(12) United States Patent
Eitan et al.

(10) Patent No.: US 10,588,038 B2
(45) Date of Patent: Mar. 10, 2020

(54) TECHNIQUE FOR OVER-THE-AIR NON-LINEARITY ESTIMATION

(71) Applicant: QUALCOMM Incorporated, San Diego, CA (US)

(72) Inventors: Alecsander Eitan, Haifa (IL); Amichai Sanderovich, Atlit (IL); Elad Hadari, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/446,934

(22) Filed: Mar. 1, 2017

(65) Prior Publication Data

US 2017/0257786 A1 Sep. 7, 2017

Related U.S. Application Data

(60) Provisional application No. 62/303,339, filed on Mar. 3, 2016.

(51) Int. Cl.
| | |
|---|---|
| *H04W 24/10* | (2009.01) |
| *H04B 17/11* | (2015.01) |
| *H04B 17/14* | (2015.01) |
| *H04L 1/16* | (2006.01) |
| *H04L 5/00* | (2006.01) |

(Continued)

(52) U.S. Cl.
CPC ............ *H04W 24/10* (2013.01); *H04B 17/11* (2015.01); *H04B 17/14* (2015.01); *H04L 1/1671* (2013.01); *H04L 5/0048* (2013.01); *H04L 5/0057* (2013.01); *H04L 1/0035* (2013.01); *H04L 1/208* (2013.01)

(58) Field of Classification Search
CPC ....... H04W 24/10; H04B 17/14; H04B 17/11; H04L 5/0048; H04L 5/0057; H04L 1/208; H04L 1/0035
See application file for complete search history.

(56) References Cited

U.S. PATENT DOCUMENTS

| | | | |
|---|---|---|---|
| 2010/0159845 A1 | 6/2010 | Kaaja et al. | |
| 2015/0003606 A1* | 1/2015 | Nemer | H04M 3/002 379/406.01 |
| 2016/0241422 A1* | 8/2016 | Akita | H04B 3/10 |

OTHER PUBLICATIONS

Cherniavsky D., et al., "Beamforming to Enable Concurrent Links for 802.11ay," IEEE Draft, vol. 802.11ay, Jul. 11, 2015, pp. 1-8, XP068094695.

(Continued)

*Primary Examiner* — Jackie Zuniga Abad
(74) *Attorney, Agent, or Firm* — Loza & Loza, LLP/Qualcomm

(57) ABSTRACT

Systems and methods are provided for estimating non-linearity of a transmitter, a receiver or both based on measurements and/or feedback. The estimation of the non-linearity may be used at the transmitter, the receiver or both to tune one or more components to reduce non-linearity. In one aspect, a method for wireless communications comprises generating at least one training signal, and outputting the at least one training signal for transmission to a wireless node. The method also comprises receiving a feedback message from the wireless node, the feedback message providing feedback of the at least one training signal received at the wireless node. The method further comprises tuning at least one component based on the feedback message.

19 Claims, 7 Drawing Sheets

(51) Int. Cl.
    *H04L 1/00*          (2006.01)
    *H04L 1/20*          (2006.01)

(56) References Cited

OTHER PUBLICATIONS

International Search Report and Written Opinion—PCT/US2017/020510—ISA/EPO—May 9, 2017.
Ramachandran Kishore., "NT—12 on Beamforming (BRP)," IEEE Draft, vol. 802.11ad (3), May 18, 2010, pp. 1-34, XP917677129.
Aladren L., et al., "Performance Comparison of Training Sequences for Power Amplifier Linearization Systems", Wireless Communication Systems (ISWCS), 2011 8th International Symposium on, IEEE, Nov. 6, 2011 (Nov. 6, 2011), pp. 6-10, XP032090026, DOI: 10.1109/1SWCS.2011.6125299, ISBN: 978-1-61284-403-9.

\* cited by examiner

TECHNIQUE FOR OVER-THE-AIR NON-LINEARITY ESTIMATION

RELATED APPLICATION

This application claims priority under 35 U.S.C. § 119(e) to U.S. Provisional Application No. 62/303,339 filed on Mar. 3, 2016, the entire specification of which is incorporated herein by reference.

FIELD

Certain aspects of the present disclosure generally relate to wireless communications and, more particularly, to non-linearity estimation in a wireless communications system.

BACKGROUND

In order to address the issue of increasing bandwidth requirements demanded for wireless communications systems, different schemes are being developed. In some schemes, data is wirelessly transmitted at high data rates over one or more channels in the 60 GHz range.

SUMMARY

A first aspect relates to an apparatus for wireless communications. The apparatus comprises a processing system configured to generate at least one training signal, and an interface configured to output the at least one training signal for transmission to a wireless node, and to receive a feedback message from the wireless node, the feedback message providing feedback of the at least one training signal received at the wireless node. The processing system is further configured to tune at least one component based on the feedback message.

A second aspect relates to a method for wireless communications. The method comprises generating at least one training signal, outputting the at least one training signal for transmission to a wireless node, receiving a feedback message from the wireless node, the feedback message providing feedback of the at least one training signal received at the wireless node, and tuning at least one component based on the feedback message.

A third aspect relates to an apparatus for wireless communications. The apparatus comprises means for generating at least one training signal, means for outputting the at least one training signal for transmission to a wireless node, means for receiving a feedback message from the wireless node, the feedback message providing feedback of the at least one training signal received at the wireless node, and means for tuning at least one component based on the feedback message.

A fourth aspect relates to a computer readable medium. The computer readable medium comprises instructions stored thereon for generating at least one training signal, outputting the at least one training signal for transmission to a wireless node, receiving a feedback message from the wireless node, the feedback message providing feedback of the at least one training signal received at the wireless node, and tuning at least one component based on the feedback message.

A fifth aspect relates to a wireless node. The wireless mode comprises a processing system configured to generate at least one training signal, and an interface configured to output the at least one training signal for transmission to a second wireless node, and to receive a feedback message from the second wireless node, the feedback message providing feedback of the at least one training signal received at the second wireless node. The wireless node also comprises at least one component, wherein the processing system is further configured to tune the at least one component in the wireless node based on the feedback message.

A sixth aspect relates to an apparatus for wireless communications. The apparatus comprises an interface configured to receive at least one training signal. The apparatus further comprises a processing system configured to determine non-linearity in the received at least one training signal based on knowledge related to the at least one training signal, and to tune at least one component based on the determined non-linearity.

A seventh aspect relates to a method for wireless communications. The method comprises receiving at least one training signal, determining non-linearity in the received at least one training signal based on knowledge related to the at least one training signal, and tuning at least one component in a receiver based on the determined non-linearity.

An eighth aspect relates to an apparatus for wireless communications. The apparatus comprises means for receiving at least one training signal, means for determining non-linearity in the received at least one training signal based on knowledge related to the at least one training signal, and means for tuning at least one component based on the determined non-linearity.

A ninth aspect relates to a computer readable medium. The computer readable medium comprises instructions stored thereon for receiving at least one training signal, determining non-linearity in the received at least one training signal based on knowledge related to the at least one training signal, and tuning at least one component in a receiver based on the determined non-linearity.

A tenth aspect relates to a wireless node. The wireless node comprises an interface configured to receive at least one training signal, and at least one component. The wireless node also comprises a processing system configured to determine non-linearity in the received at least one training signal based on knowledge related to the at least one training signal transmitted by the wireless device, and to tune the at least one component based on the determined non-linearity.

DETAILED DESCRIPTION

Figure 1:
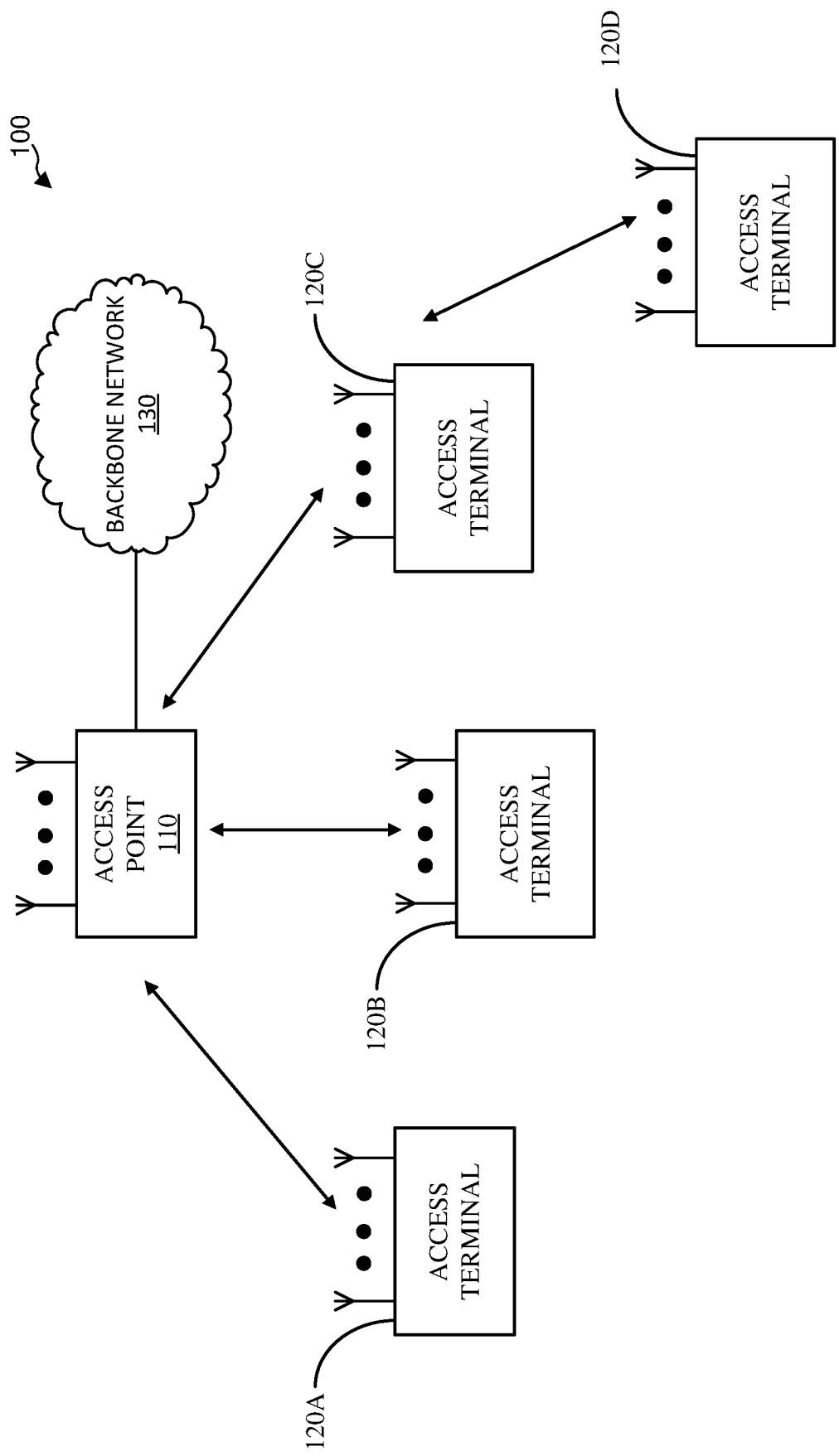
FIG. 1 illustrates an exemplary wireless communication system in accordance with certain aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates an example of a wireless communication system 100 with access points and access terminals. For simplicity, only one access point 110 is shown in FIG. 1. An access point is generally a fixed station that communicates with the access terminals and may also be referred to as a base station or some other terminology. An access terminal may be fixed or mobile and may also be referred to as a mobile station, a wireless device or some other terminology. Access point 110 may communicate with one or more access terminals 120 at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. The access point 110 may be coupled to a backbone network 130 (e.g., the Internet) to provide the access terminals with access to the backbone network 130.

Figure 2:
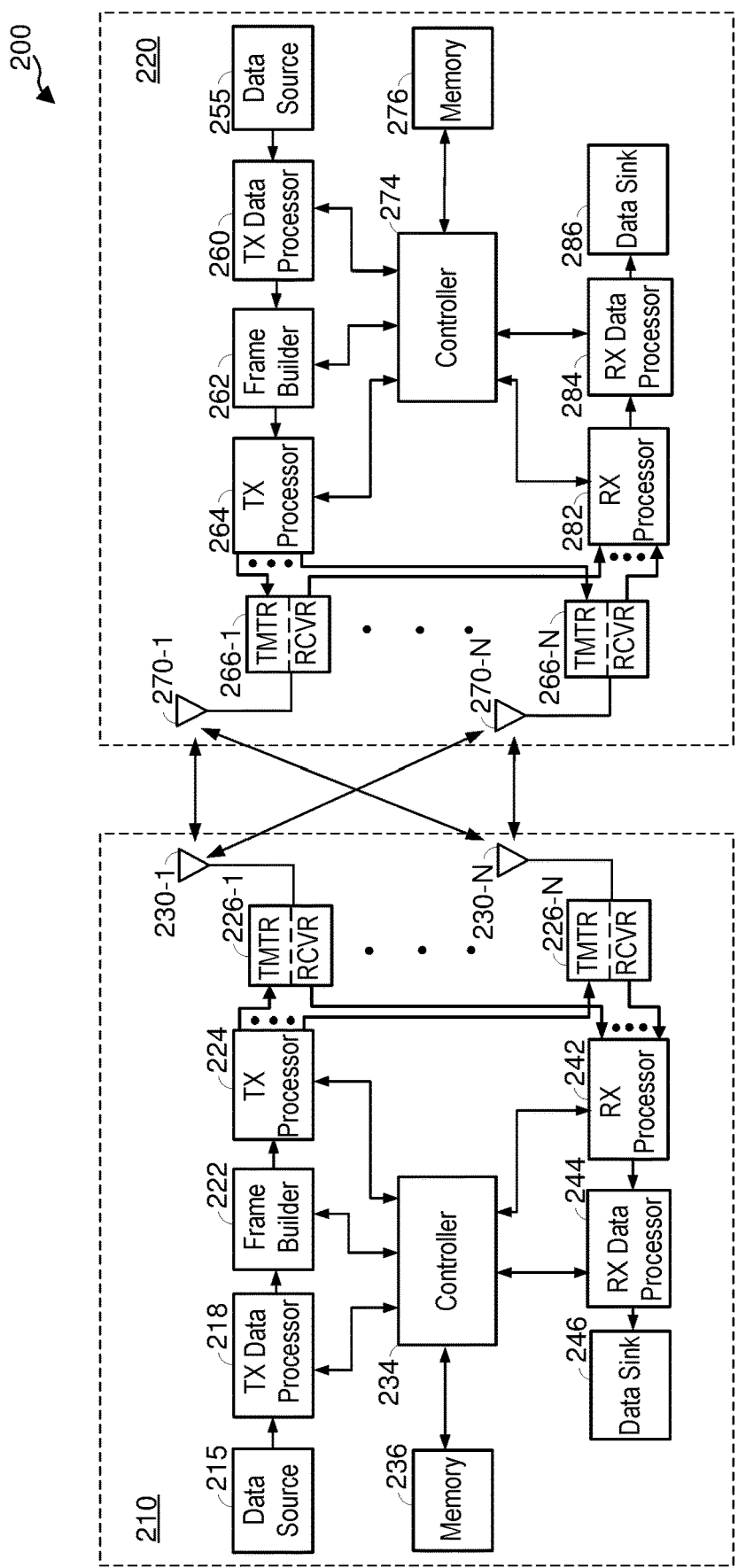
FIG. 2 is a block diagram of an exemplary access point and access terminal in accordance with certain aspects of the present disclosure.

FIG. 2 illustrates a block diagram of an access point 210 (generally, a first wireless node) and an access terminal 220 (generally, a second wireless node) of the wireless communication system 200. The access point 210 is a transmitting entity for the downlink and a receiving entity for the uplink. The access terminal 220 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel.

Although, in this example, wireless node 210 is an access point and wireless node 220 is an access terminal, it shall be understood that the wireless node 210 may alternatively be an access terminal, and wireless node 220 may alternatively be an access point. The wireless node 210 may be used to implement the access point 110 in FIG. 1, and the wireless node 220 may be used to implement any one of the access terminals 120 in FIG. 1.

For transmitting data, the access point 210 comprises a transmit data processor 218, a frame builder 222, a transmit processor 224, a plurality of transceivers 226-1 to 226-N, and a plurality of antennas 230-1 to 230-N. The access point 210 also comprises a controller 234 configured to control operations of the access point 210, as discussed further below.

In operation, the transmit data processor 218 receives data (e.g., data bits) from a data source 215, and processes the data for transmission. For example, the transmit data processor 218 may encode the data (e.g., data bits) into encoded data, and modulate the encoded data into data symbols. The transmit data processor 218 may support different modulation and coding schemes (MCSs). For example, the transmit data processor 218 may encode the data (e.g., using low-density parity check (LDPC) encoding) at any one of a plurality of different coding rates. Also, the transmit data processor 218 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 218 specifying which modulation and coding scheme (MCS) to use (e.g., based on channel conditions of the downlink), and the transmit data processor 218 may encode and modulate data from the data source 215 according to the specified MCS. It is to be appreciated that the transmit data processor 218 may perform additional processing on the data such as data scrambling, and/or other processing. The transmit data processor 218 outputs the data symbols to the frame builder 222.

The frame builder 222 constructs a frame (also referred to as a packet), and inserts the data symbols into a data payload of the frame. Exemplary frame structures or formats are discussed further below. The frame builder 222 outputs the frame to the transmit processor 224. The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 210 includes multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 220 comprises a transmit data processor 260, a frame builder 262, a transmit processor 264, a plurality of transceivers 266-1 to 266-N, and a plurality of antennas 270-1 to 270-N. The access terminal 220 may transmit data to the access point 210 on the uplink, and/or transmit data to another access terminal (e.g., for peer-to-peer communication). The access terminal 220 also comprises a controller 274 configured to control operations of the access terminal 220, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. Exemplary frame structures or formats are discussed further below. The frame builder 262 outputs the frame to the transmit processor 264. The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 220 includes multiple antennas 270-1 to 270-N and multiple transceivers 266-1 to 266-N (e.g., one for each antenna). The transmit processor 264 may perform spatial processing on the incoming frame and provide a plurality of transmit frame streams for the plurality of antennas. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 210 comprises a receive processor 242, and a receive data processor 244. In operation, the transceivers 226-1 to 226-N receive signals (e.g., from the access terminal 220) via the antennas 230-1 to 230-N, and process (e.g., frequency downconvert, amplify, filter and convert to digital) the received signals.

The receive processor 242 receives the outputs of the transceivers 226-1 to 226-N, and processes the outputs to recover data symbols. For example, the access point 210 may receive data (e.g., from the access terminal 220) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 220 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 220 comprises a receive processor 282, and a receive data processor 284. In operation, the transceivers 266-1 to 266-N receive signals (e.g., from the access point 210 or another access terminal) via the antennas 270-1 to 270-N, and process (e.g., frequency downconvert, amplify, filter and convert to digital) the received signals.

The receive processor 282 receives the outputs of the transceivers 266-1 to 266-N, and processes the outputs to recover data symbols. For example, the access terminal 220 may receive data (e.g., from the access point 210 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 220 includes multiple antennas 270-1 to 270-N and multiple transceivers 266-1 to 266-N (e.g., one for each antenna). Each transceiver receives and processes (e.g., frequency downconverts, amplifies, filters, and converts to digital) the signal from the respective antenna. The receive processor 282 may perform spatial processing on the outputs of the transceivers to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 220 also comprises a memory 276 coupled to the controller 274. The memory 276 may store instructions that, when executed by the controller 274, cause the controller 274 to perform the one or more of the operations described herein.

Linearity Tuning

In mmWave communication systems, 60 GHz (e.g., IEEE 802.11ad and IEEE 802.11ay) communication is based on using directional antennas on both sides for achieving a reasonable link (high enough SNR at the receiver). In addition, each antenna element may have its own active components (e.g. power amplifier, LNA, phase shifters) that have inherent non-linearity impairments. In practical implementations, passive components may also exhibit non-linear behavior. System non-linearity is caused by analog components at all stages including the base-band stage, intermediate frequency (IF) stage and radio frequency (RF) stage.

In all operation modes and configurations, the analog components are typically operated partially in their non-linear range. It is common practice that analog circuits, especially RF circuits, are configured to get the most out of them by utilizing the maximum dynamic range possible. The dynamic range is limited at the lower edge by the noise of the components and limited at the higher edge by non-linearity. It also should be noted that in mmWave many factors impact the components including: power, temperature, manufacturing and more. An additional mmWave difficulty is that RF loopback may not be practical due to wavelength, the fact that each antenna array is composed of many elements, and the fact that different configurations are used (e.g. beam forming). On-board loopback methods are suitable for measuring one transmit element or one transmit element at a time. However, the non-linearity seen by the receiver is in far-field or near-field where all active transmit elements are combined according to the beamforming configuration. In this case, even a full set of measurements for each element is not complete to estimate the non-linearity at the receiver, and full measurement circuitry is expensive. Furthermore, OFDM modulation and high constellations have large peak-to-average power ratio (PAPR), making the system more susceptible to non-linearity.

Existing methods for non-linear mitigation include production linearity calibration, using better components (which adds costs), self calibration, higher power consumption, back-off (reducing the usable dynamic range), and reducing transmit power (which reduces efficiency and achievable throughput). Production linearity calibration can be expensive and has limited performance Self calibration is difficult to achieve in 60 GHz due to the use of phase antenna arrays.

Embodiments of the present disclosure provide training flows between pairs of wireless devices (e.g., AP 210 and AT 220) to facilitate linearity tuning on each side. A solution for linearity tuning according to aspects of the present disclosure may include:

A control frame that includes fields for signaling and results report.

A message trailer specifically crafted for linearity measurements. The message trailer may include one or more linearity training (LTRN) signals that may have a similar format (e.g., block length) as existing TRN signals used for beamforming training (e.g., for compatibility with IEEE 802.11ad and IEEE 802.11ay).

A protocol to allow wireless devices to communicate with each other to facilitate linearity training.

Algorithms for transmitter and receiver linearity tuning, which may be implementation dependent.

Figure 3:
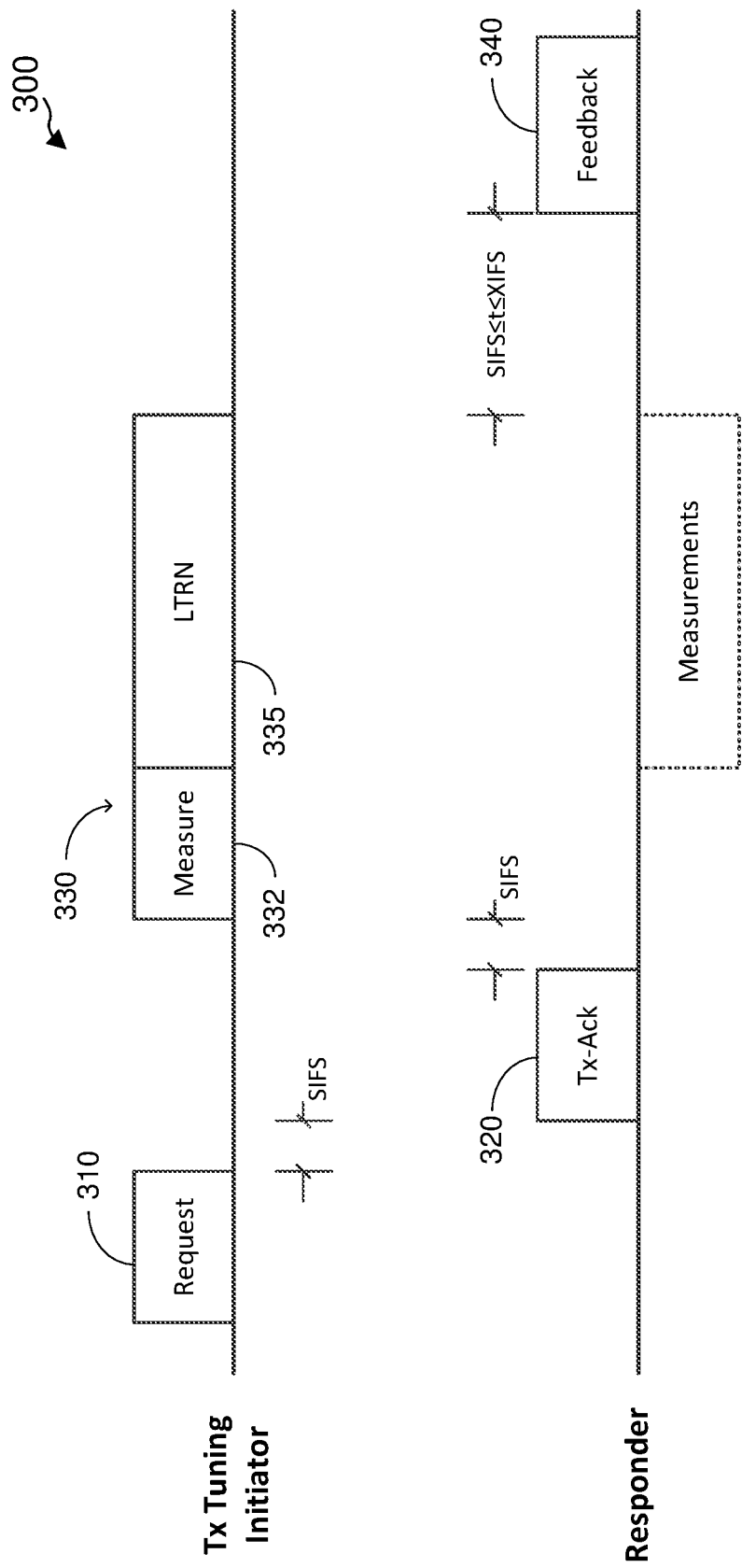
FIG. 3 illustrates an example of transmitter linearity training according to certain aspects of the present disclosure.

FIG. 3 illustrates an exemplary flow 300 for transmitter (TX) linearity tuning according to aspects of the present disclosure. In this example, the flow 300 is between an initiator and a responder, each of which may be a wireless device (e.g., AP 210 or AT 220). Transmitter linearity tuning is performed at the initiator with the assistance of the responder, as discussed further below.

As shown in FIG. 3, the initiator transmits a request 310 for transmitter linearity tuning to the responder. The request 310 may include fields describing one or more LTRN signals that the initiator plans to transmit to the responder. More particularly, the fields may include a field indicating a number of the one or more LTRN signals. For example, each LTRN signal may be in the form of an LTRN block, which may have a similar format (e.g., block length) as a TRN block used for beamforming (including extension for channel bonding (CB)>1). In this example, the field may indicate a number of the LTRN blocks. The fields may also include a field indicating one or more types of the LTRN signals. For example, the flow 300 may support different types of LTRN signals, examples of which are provided below. The fields may also include a field indicating a duration of the LTRN signals. Examples of additional fields that may be included in the request 310 are discussed further below. In this disclosure, a field indicating one or more attributes of the LTRN signals may also be referred to as an indicator.

In response to the request 310, the responder may transmit an acknowledgement 320 (TX-Ack) to the initiator acknowledging reception of the request. The acknowledgement 320 may include additional parameters for the LTRN signals, as discussed further below. In the example in FIG. 3, the request 310 and acknowledgement 320 are approximately separated by a short interframe space (SIFS).

In response to the acknowledgement 320, the initiator may transmit a frame 330 (e.g., media access control (MAC) frame) to the responder including the one or more LTRN signals. In the example in FIG. 3, the frame 330 may include a first portion 332 and a trailer portion 335. In this example, the first portion 332 may include frame overhead (e.g., address of initiator, address of responder, duration of frame, etc.). The frame overhead allows the responder to identify the frame 330. The first portion 332 may also include data payload portion (e.g., frame body), which may be empty in this example. The trailer portion 335 (which may be at the end of the frame 330) includes the one or more LTRN signals. The trailer portion 335 may be the same or similar to the trailer portion of a frame used to transmit TRN signals for beamforming (e.g., for compatibility with IEEE 802.11ad and IEEE 802.11ay). The trailer may include LTRN signals of the same type or a concatenation of LTRN signals of different types.

As the responder receives the one or more LTRN signals, the responder performs measurements of the received LTRN signals. For example, a receiver of the responder may perform front-end processing on the one or more LTRN signals and sample the one or more LTRN signals (e.g., using an analog to digital converter (ADC)). The responder may then store (record) the samples in a buffer. In one example, the responder may store (record) the raw samples in the buffer. In another example, the responder may equalize the samples, and store (record) the equalized samples in the buffer. In this example, the responder may estimate the channel between the initiator and responder using one or more channel estimation fields (CEFs) in the frame 330, and equalize the samples based on the channel estimation.

The responder may then generate a feedback message 340 including the samples in the buffer, and transmits the feedback message 340 to the initiator. The feedback message provides the initiator with feedback on the received one or more LTRN signals at the responder. Transmission of the feedback message 340 may be delayed to allow processing to generate the feedback message 340. In the example in FIG. 3, the delay is between SIFS and XIFS, where XIFS is an upper bound of the delay.

After receiving the feedback message 340, the initiator performs transmitter linearity tuning using the received samples in the feedback message 340 to reduce non-linearity, as discussed further below. The flow 300 in FIG. 3 may be repeated (e.g., if the initiator needs more samples for transmitter (TX) linearity tuning).

As discussed above, the initiator uses the received samples to perform transmitter linearity tuning. More particularly, the received samples provides the initiator with information on the one or more LTRN signals received at the responder. Since the initiator knows the one or more LTRN signals output to the transmitter for transmission to the responder, the initiator can determine (deduce) non-linear distortion in the one or more LTRN signals received at the responder from the received samples. The initiator may tune one or more components in the initiator based on the determined non-linear distortion to reduce the non-linear distortion.

For example, the initiator may tune the one or more components to different operating points. For each operating point, the initiator may initiate the flow 300 in FIG. 3 to receive samples for the operating point, and hence determine the non-linear distortion for the operating point based on a comparison of the known LTRN signals and the received samples. The initiator may then select the operating point resulting in the least amount of non-linear distortion (the operating point with the highest linearity).

In one example, the initiator may use a pre-distorter to reduce non-linearity of a power amplifier (PA) in a transmitter of the initiator. In this example, the pre-distorter is configured to pre-distort a signal before the signal is input to the PA, in which the pre-distortion of the signal compensates for non-linear distortion of the PA. This results in reduced non-linearity at the PA output (linearizes the signal at the PA output). The use of pre-distortion allows the initiator to operate partially in the non-linear region of the PA (e.g., closer to saturation point) for increased efficiency compared to backing off the saturation point (e.g., limiting operation to the linear region of the PA). The pre-distorter may pre-distort the signal in the digital domain or the analog domain.

In this example, the initiator may determine non-linear distortion in one or more LTRN signals received at the responder based on corresponding samples from the responder. The initiator may then tune the pre-distorter (e.g., shape the pre-distortion of the pre-distorter) based on the determined non-linear distortion to reduce the non-linear distortion.

In another example, the initiator may use one or more filters to reduce phase error in a signal caused by non-linearity of one or more components in the initiator. In this example, the one or more filters may perform non-linear phase operations on the signal that reduce the phase error. The non-linear phase operations may include phase shifting at selected frequencies. The one or more filters may be in the digital domain or the analog domain.

In this example, the initiator may determine phase error in one or more LTRN signals received at the responder based on corresponding samples from the responder. Since the initiator knows the one or more LTRN signals output to the transmitter for transmission to the responder, the initiator can determine the phase error from the samples of the one or more LTRN signals received at the responder. The initiator may then tune the one or more filters based on the determined phase error.

In one example, the initiator may include multiple filters, in which each filter performs different non-linear phase operations, and the initiator may select any one of the filters to process a signal. In this example, the initiator may select each filter one at a time, and initiate the flow 300 in FIG. 3 to receive samples for each filter, and hence determine the phase error for each filter based on a comparison of the known LTRN signals and the received samples. The initiator may then select the filter resulting in the least amount of phase error.

As discussed above, the initiator request 310 may include a field indicating a number of LTRN blocks. If the responder does not support the number of LTRN blocks due to buffer limitation (e.g., the buffer of the responder does not have sufficient space to store the samples for the requested number of blocks), then the responder may include a field in the acknowledgement 320 specifying the available buffer space at the responder. For example, the field may specify the number of LTRN blocks that the buffer can handle. In response, the initiator may transmit the specified number of LTRN blocks in the frame 330, and transmit the remaining LTRN blocks by repeating the flow 300.

Figure 4:
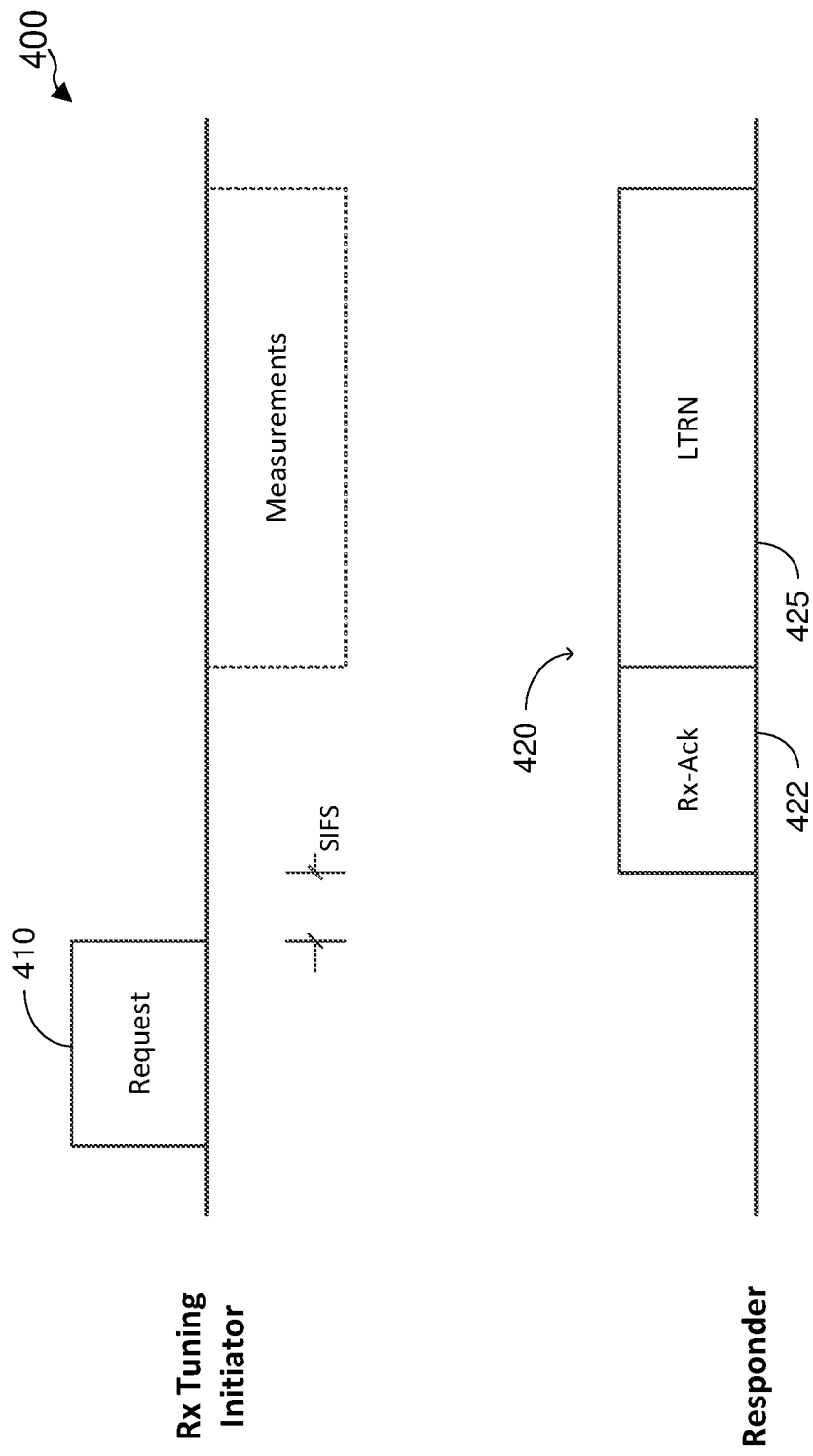
FIG. 4 illustrates an example of receiver linearity training according to certain aspects of the present disclosure.

FIG. 4 illustrates an exemplary flow 400 for receiver (RX) linearity tuning according to aspects of the present disclosure. In this example, the flow 400 is between an initiator and a responder, each of which may be a wireless device (e.g., AP 210 or AT 220). Receiver linearity tuning is performed at the initiator with the assistance of the responder, as discussed further below.

As shown in FIG. 4, the initiator transmits a request 410 for receiver linearity tuning to the responder. The request 410 may include fields describing one or more LTRN signals that the initiator requests the responder to transmit. More particularly, the fields may include a field indicating a number of the one or more LTRN signals. For example, each LTRN signal may be in the form of an LTRN block, which may have a similar format (e.g., block length) as a TRN block used for beamforming (including extension for channel bonding (CB)>1). In this example, the field may indicate a number of the LTRN blocks. The fields may also include a field indicating one or more types of the LTRN signals. For example, the flow 400 may support different types of LTRN signals, examples of which are provided below. The fields may also include a field indicating a duration of the LTRN signals. Examples of additional fields that may be included in the request 410 are discussed further below.

In response to the request 410, the responder may transmit a frame 420 (e.g., media access control (MAC) frame) to the initiator including the requested one or more LTRN signals. In the example in FIG. 4, the frame 420 may include a first portion 422 and a trailer portion 425. In this example, the first portion 422 may include frame overhead (e.g., address of initiator, address of responder, duration of frame, etc.). The first portion 422 may also include an acknowledgement (Rx-Ack) acknowledging the request. The first portion 422 may also include additional parameters for the one or more LTRN signals. The trailer portion 425 (which may be at the end of the frame 420) includes the one or more LTRN signals. The trailer portion 425 may be the same or similar to the trailer portion of a frame used to transmit TRN signals for beamforming (e.g., for compatibility with IEEE 802.11ad and IEEE 802.11ay). The trailer may include LTRN signals of the same type or a concatenation of LTRN signals of different types. In the example in FIG. 4, the request 410 and the frame 420 are approximately separated by a short interframe space (SIFS).

As the initiator receives the one or more LTRN signals, the initiator performs measurements of the received LTRN signals. For example, a receiver of the initiator may perform front-end processing on the one or more LTRN signals and sample the one or more LTRN signals (e.g., using an analog to digital converter (ADC)). The initiator may then process the samples to determine non-linear distortion in the received one or more LTRN signals for receiver linearity tuning, as discussed further below. The flow 400 in FIG. 4 may be repeated by the initiator (e.g., if the initiator needs more samples for receiver (RX) linearity tuning).

A receiver which has knowledge about non-linearity of the transmitter, the receiver or both may use iterative decoding techniques known in the art to improve reception performance by accounting for the non-linearity.

As discussed above, the initiator uses the received one or more LTRN signals to perform receiver linearity tuning. To do this, the initiator may know the one or more LTRN signals transmitted by the responder. For example, the initiator and responder may support different types of LTRN signals (examples of which are provided below), in which each type of LTRN signal is known a priori by the initiator and responder. In this example, the initiator may specify, in the request 410, a type of an LTRN signal for the responder to transmit, and, in response, the responder may transmit the requested type of LTRN signal in the frame 420 (e.g., in the trailer portion of the frame 420). Since the initiator specifies the type of LTRN signal the responder transmits in this example, the initiator knows the type of LTRN signal transmitted.

Because the initiator knows the one or more LTRN signals transmitted by the responder, the initiator can determine (deduce) non-linear distortion in the received one or more LTRN signals by the comparing the received one or more LTRN signals with the known one or more LTRN signals at the responder. The initiator may then tune one or more components in the initiator (e.g., receiver of the initiator) based on the determined non-linear distortion to reduce the non-linear distortion (e.g., reduce non-linearity in the receiver).

For example, the initiator may tune the one or more components (e.g., in the receiver) to different operating points. For each operating point, the initiator may initiate the flow 400 in FIG. 4 to receive one or more LTRN signals for the operating point, and hence determine the non-linear distortion for the operating point based on a comparison of the known LTRN signals and the received LTRN signals. The initiator may then select the operating point resulting in the least amount of non-linear distortion (the operating point with the highest linearity).

Examples of different types of LTRN signals that may be used are given below according to certain aspects of the present disclosure. It is to be appreciated that the present disclosure is not limited to these examples.

In one example, an LTRN signal may include a modulated pseudorandom binary sequence (PRBS) data. Examples of modulated PRBS data that may be used include SC π/2 BPSK modulated PRBS data, SC 64QAM modulated PRBS data, OFDM 64QAM modulated PRBS data, etc.

In certain aspects, modulated PRBS data may have a varying amplitude that varies slowly from a first value to a second value. For example, the amplitude of the PRBS data may slowly increase from the first amplitude value to the second amplitude value, or slowly decrease from the first amplitude value to the second amplitude value. In this example, a request 310 or 410 from an initiator may include parameter fields indicating the first and second values. The first and second values may be given relative to a nominal value (e.g., nominal power) defined by a CEF, as discussed further below. In one example, the modulated PRBS data with slowly varying amplitude may include SC π/2 BPSK modulated PRBS data with slowly varying amplitude.

Modulated PRBS data with slowly varying amplitude may be used, for example, to characterize non-linearity of a PA over an amplitude range (e.g., input amplitude range). In this example, the amplitude at the output of the PA may be squeezed as the amplitude at the input of the PA increases due to saturation of the PA. The squeezing at high amplitude results in non-linearity distortion of the signal. In this example, the slowly varying amplitude of the modulated data may be used by the initiator to characterize the non-linearity of the PA over the amplitude range based on the samples from the feedback message. The initiator may then tune the pre-distorter to reduce the non-linearity (e.g., pre-distort a signal with an inverse of the determined non-linear distortion of the PA).

It is to be appreciated that the present disclosure is not limited to the example of modulated PRBS data and may include other types of data that are modulated.

In another example, an LTRN signal may include a Gaussian signal (e.g., Gaussian signal generated from PRBS). In this example, the request 310 or 410 from an initiator may include a parameter field indicating a standard deviation (std) of the Gaussian signal.

In yet another example, an LTRN signal may include a chirp signal to cover a bandwidth with configurable amplitude. For instance, the chirp signal may be a signal with a frequency that varies across a desired bandwidth. The amplitude of the chirp signal may set to two or more different values (e.g., three amplitude values) for equal durations. For each of the equal durations, the frequency of the chirp signal may be varied across approximately the entire bandwidth or a portion of the bandwidth. In this example, a request 310 or 410 may include parameter fields indicating the two or more different values. The two or more values may be given relative to a nominal value (e.g., nominal power) defined by a CEF, as discussed further below.

In certain aspects, a transmitting wireless device (e.g., initiator or responder) may transmit a channel estimation field (CEF) with each LTRN signal (e.g., LTRN block). The receiving wireless device may use each received CEF to estimate the channel between the transmitting device and receiving device, and equalize samples of the respective LTRN signal (e.g., LTRN block) using the channel estimation. For transmitter (TX) linearity tuning, the equalized sample may be transmitted to the initiator in a feedback message. The equalized samples may include the guard interval (GI) and cyclic prefix (CP) (e.g., for OFDM).

In this example, a transmitting device (e.g., initiator or responder) may transmit a CEF at a nominal power or amplitude, and the receiving device may use the received power or amplitude of the CEF to determine the nominal power or amplitude at the receiving device. The transmitting device may then transmit an LTRN signal or other signal at a power or amplitude that is higher than the nominal power or amplitude by a certain amount (e.g., two times higher, four times higher, etc.). In this example, the transmitting device may transmit an indicator (e.g., in a request 310 or 410 and/or frame 330 or 420) indicating the power or amplitude of an LTRN signal or other signal relative to the nominal power or amplitude defined by the CEF. The receiving device may tune (setup) its receiver to receive the LTRN signal or other signal at the indicated power or amplitude.

In certain aspects, linearity measurements may be performed using the DPHY setup (e.g., used to transmit data). The DPHY setup may include channel bonding (CB), beamforming (BF), transmit (TX) power, receiver (RX) automatic gain control (AGC), and modulation.

Table 1 below provides exemplary fields that may be included in a MAC frame. The frame may be used for parameter exchange and negotiation (e.g., request), measurements (e.g., frame 330 or 420), and/or measurement feedback (e.g., feedback message 340). This frame may be similar to the BRP frame defined in IEEE 802.11ad. The exemplary fields listed below may be optional and used when needed in a frame. In Table 1 below STA may refer to a wireless device, which may also be referred to as a Station (STA).

TABLE 1

| Name | Size [bits] | Set | Description |
|---|---|---|---|
| Request Rx tuning | 1 | | Sent by STA to request its receiver tuning |
| Ack Rx tuning | 1 | | Sent by STA to acknowledge transmission of trailer for Rx tuning |
| Request Rx tuning blocks types (Nty) | 4 (0 ... 15) | | Number trailer blocks types. Signals number of Set A sets of fields |
| Request Rx tuning #i: blocks type | 3 (0 ... 7) | A | Type of trailer |
| Request Rx tuning #i: number of blocks | 5 (1 ... 32) | A | Number of blocks |
| Parameter_A for block #i | 8 | A | Parameter A for the type configuration |
| Parameter_B for block #i | 8 | A | Parameter B for the type configuration |
| Parameter_C for block #i | 8 | A | Parameter C for the type configuration |
| Request Tx tuning | 1 | | Sent by STA to request its transmitter tuning |
| Ack Tx tuning | 1 | | Sent by STA to acknowledge Tx tuning assistance |
| Request Tx tuning blocks | 8 | | Number of blocks that transmitter will send and receiver needs to send feedback on. |
| Ack Tx tuning blocks | 8 | | The number of blocks the receiver commits to process. If it less than the number requested, the transmitter should use this limit. Receiver will process only this value, starting from first. Field also used to signal number of feedback blocks (Set B) |
| Requested Tx tuning signal processing | 4 | | Value represents the processing type that the transmitter requests the receiver to perform before samples are sent back. |
| Tx tuning requested PAPR | 8 | | Value of the PAPR that transmitter requests the receiver to handle linearly. Average power refers to CEF field. |
| Tx tuning requested lowest signal | 8 | | Value of the lowest signal that transmitter requests the receiver to handle with low noise. Power refers to CEF field. |
| Tx tuning signal processing | 4 | | Value represents the processing type that the receiver performed on the samples. |
| Tx tuning block feedback index | 8 | B | Index of feedback block |
| Tx tuning block feedback SNR | 8 | B | SNR of the received block, computed on the CEF field |
| Tx tuning block feedback samples | N | B | Complex samples received per block, including the CEF field. The length (N) vary according to number of bonded channels. |

Figure 5:
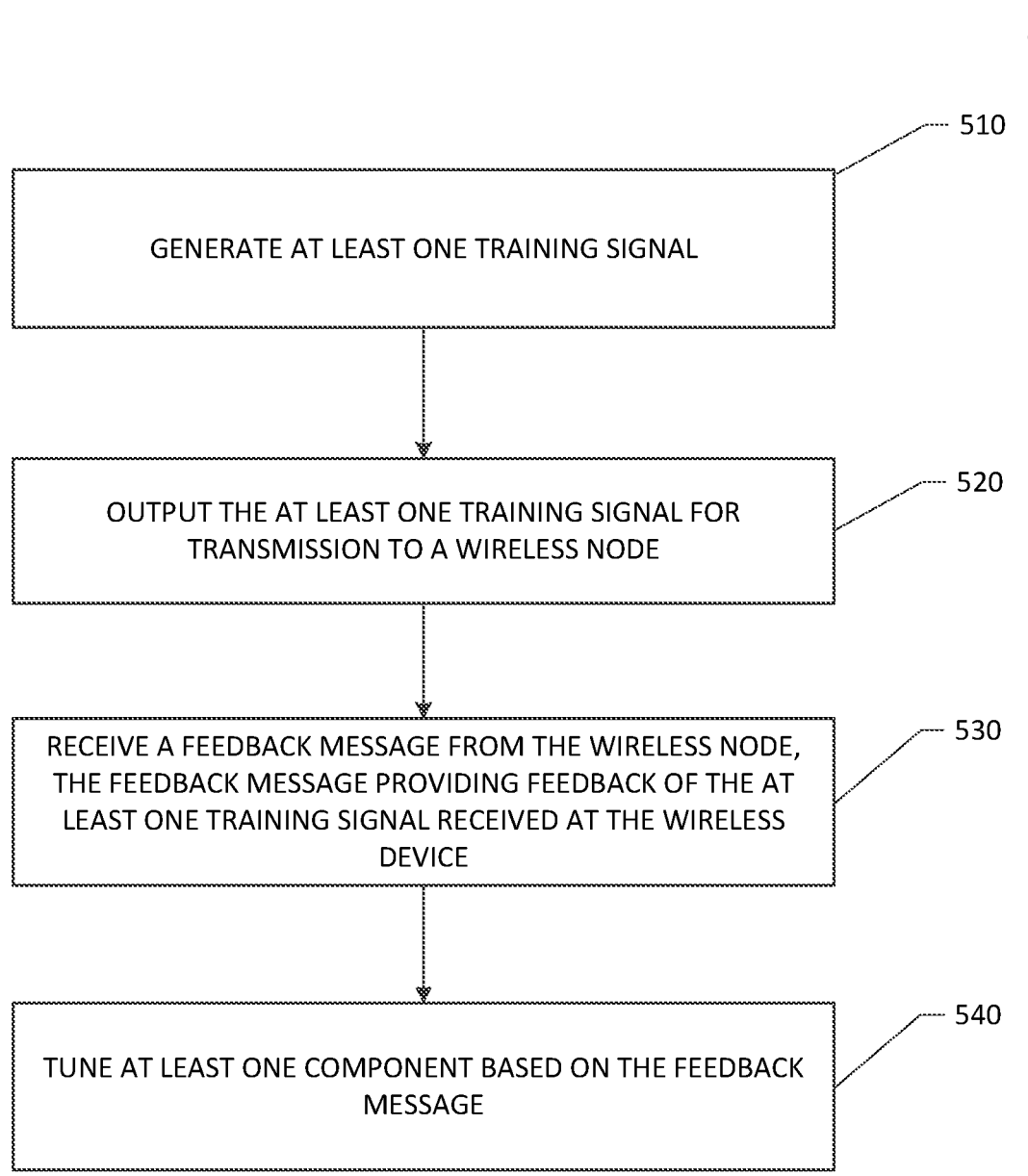
FIG. 5 is a flowchart of a method for wireless communication in accordance with certain aspects of the present disclosure.

FIG. 5 shows a method 500 for transmitter linearity tuning according to aspects of the present disclosure. In step 510, at least one training signal is generated. For example, the at least one training signal may include one or more LTRN signals. At step 520, the at least one training signal is output for transmission to a wireless node. In step 530, a feedback message is received from the wireless node, the feedback message providing feedback of the at least one training signal received at the wireless node. For example, the feedback message may include samples of the at least one training signal received at the wireless node. The wireless node may include an AT 120 or AP 110. At step 540, at least one component is tuned based on the feedback message. For example, the at least one component may include a pre-distorter, a PA, an LNA, a filter, etc.

Figure 6:
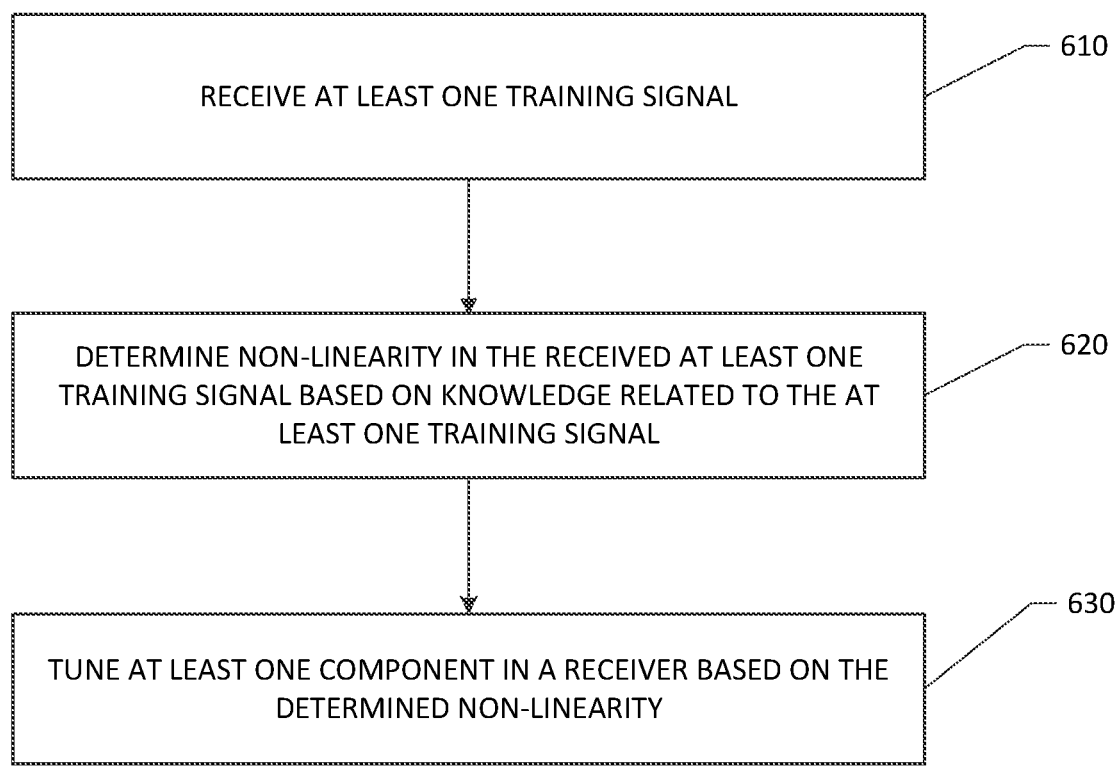
FIG. 6 is a flowchart of another method for wireless communication in accordance with certain aspects of the present disclosure.

FIG. 6 shows a method 600 for receiver linearity tuning according to aspects of the present disclosure. At step 610, at least one training signal is received. For example, the at least one training signal may include one or more LTRN signals. In step 620, non-linearity in the received at least one training signal is determined based on knowledge related to the at least training signal. For example, the non-linearity may be determined by comparing the received at least one training signal with the known of at least training signal at a transmitter. In step 630, at least one component is tuned in a receiver based on the determined non-linearity.

Figure 7:
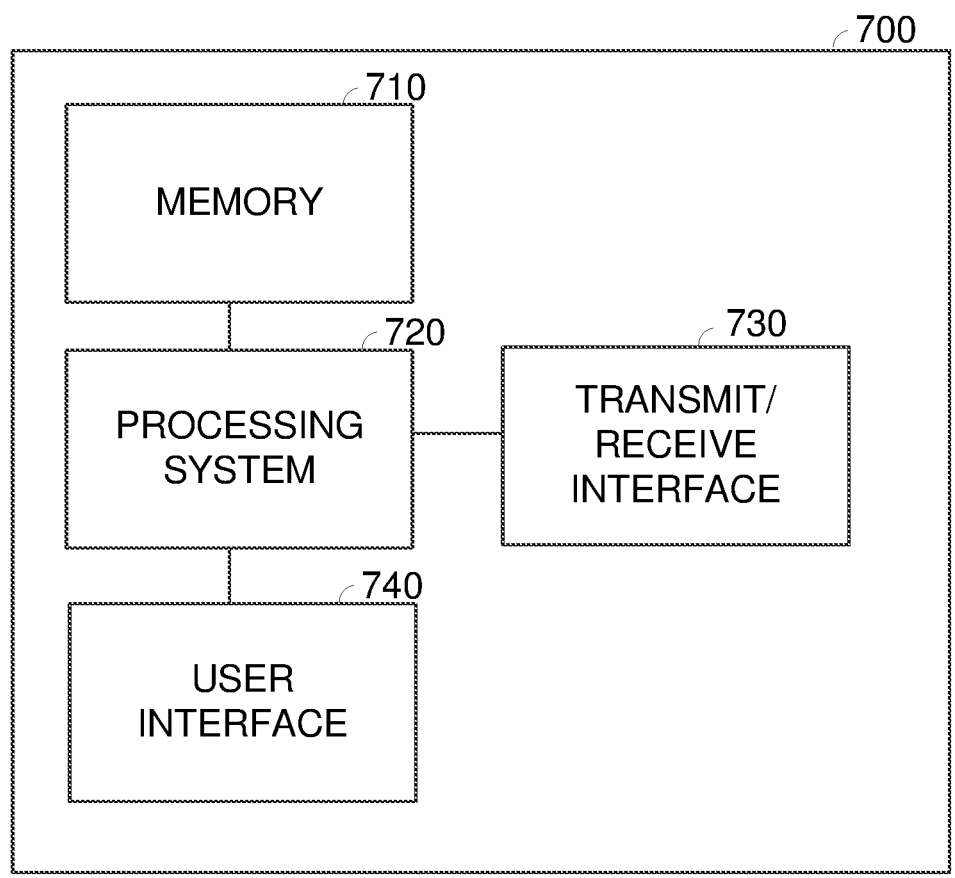
FIG. 7 illustrates an exemplary device in accordance with certain aspects of the present disclosure.

FIG. 7 illustrates an example device 700 according to certain aspects of the present disclosure. The device 700 may be configured to operate in a wireless device (e.g., access point 210 or access terminal 220) and to perform one or more of the operations described herein. The device 700 includes a processing system 720, and a memory 710 coupled to the processing system 720. The memory 710 may store instructions that, when executed by the processing system 720, cause the processing system 720 to perform one or more of the operations described herein. Exemplary implementations of the processing system 720 are provided below. The device 700 also comprises a transmit/receiver interface 730 coupled to the processing system 720. The interface 730 (e.g., interface bus) may be configured to interface the processing system 720 to a radio frequency (RF) front end (e.g., transceivers 226-1 to 226-N or 226-1 to 266-N).

In certain aspects, the processing system 720 may include one or more of the following: a transmit data processor (e.g., transmit data processor 218 or 260), a frame builder (e.g., frame builder 222 or 262), a transmit processor (e.g., transmit processor 224 or 264) and/or a controller (e.g., controller 234 or 274) for performing one or more of the operations described herein.

In the case of an access terminal 220, the device 700 may include a user interface 740 coupled to the processing system 720. The user interface 740 may be configured to receive data from a user (e.g., via keypad, mouse, joystick, etc.) and provide the data to the processing system 720. The user interface 740 may also be configured to output data from the processing system 720 to the user (e.g., via a display, speaker, etc.). In this case, the data may undergo additional processing before being output to the user. In the case of an access point 210, the user interface 740 may be omitted.

Examples of means for generating at least one training signal may include at least one of the frame builder 222 or 262, the transmit processor 224 or 264, or the processing system 720. Examples of means for outputting the at least one training signal may include at least one of the transmit processor 224 or 264, the transceivers 226-1 to 226-N or 266-1 to 266-N, or the transmit/receiver interface 730. Examples of means for receiving the feedback message may include at least one of the receive processor 242 or 282, the transceivers 226-1 to 226-N or 266-1 to 266-N, or the transmit/receiver interface 730. Examples of means for tuning at least one component may include at least one of the controller 234 or 274, or the processing system 720. Examples of means for determining non-linearity in the at least one training signal received at the wireless node based on the one or more samples may include at least one of the controller 234 or 274, or the processing system 720. Examples of means for tuning the at least one component based on the determined non-linearity may include at least one of the controller 234 or 274, or the processing system 720. Example of means for generating the one or more indicators may include at least one of the frame builder 222 or 262, the transmit processor 224 or 264, or the processing system 720. Examples of means for outputting the one or more indicators may include at least one of the transmit processor 224 or 264, the transceivers 226-1 to 226-N or 266-1 to 266-N, and the transmit/receiver interface 730. Examples of means for tuning the pre-distorter may include at least one of the controller 234 or 274, or the processing system 720. Examples of means for tuning the at least one filter may include at least one of the controller 234 or 274, or the processing system 720.

Examples of means for receiving at least one training signal may include at least one of the receive processor 242 or 282, the transceivers 226-1 to 226-N or 266-1 to 266-N, or the transmit/receiver interface 730. Examples of means for determining non-linearity in the received signal may include at least one of the receive processor 242 or 282, the controller 234 or 274, or the processing system 720. Examples of means for tuning at least one component may include at least one of the controller 234 or 274, or the processing system 720. Examples of means for generating a request for the at least one training signal may include at least one of the frame builder 222 or 262, the transmit processor 224 or 264, or the processing system 720. Examples of means for outputting the request may include at least one of the transmit processor 224 or 264, the transceivers 226-1 to 226-N or 266-1 to 266-N, or the transmit/receiver interface 730. Examples of means for comparing the received at least one training signal with at least one known training signal may include at least one of the controller 234 or 274, or the processing system 720. Examples of means for determining the non-linearity in the received at least one training signal based on the comparison may include at least one of the controller 234 or 274, or the processing system 720. Examples of means for determining the non-linearity over an amplitude range based on the varying amplitude may include at least one of the controller 234 or 274, or the processing system 720. Examples of means for tuning the at least one filter may include at least one of the controller 234 or 274, or the processing system 720.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 220 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
 a processing system configured to generate at least one training signal; and
 an interface configured to output the at least one training signal for wireless transmission to a wireless node, and to receive a feedback message from the wireless node, the feedback message providing feedback of the at least one training signal received at the wireless node based on measurements of the at least one training signal in the wireless node;
 wherein the processing system is further configured to:
  determine a non-linear distortion in the at least one training signal received at the wireless node, said determination being based on the feedback message, the non-linear distortion arising, in part, due to the operation of one or more components in the apparatus; and
  tune at least one component of the one or more components based on the determined non-linear distortion in order to reduce the non-linear distortion in the apparatus.

2. The apparatus of claim 1, wherein the feedback message includes one or more samples of the at least one training signal received at the wireless node.

3. The apparatus of claim 2, wherein the one or more samples of the at least one training signal include at least one of one or more raw samples of the at least one training signal or one or more equalized samples of the at least one training signal.

4. The apparatus of claim 1, wherein:
 the processing system is configured to generate one or more indicators indicating at least one of a number of the at least one training signal, a type of the at least one training signal, a duration of the at least one training signal, or one or more parameters of the at least one training signal; and
 the interface is configured to output the one or more indicators for transmission to the wireless node.

5. The apparatus of claim 1, wherein the at least one training signal includes at least one of modulated pseudo-random binary sequence (PRBS) data, a Gaussian signal, or a chirp signal.

6. The apparatus of claim 5, wherein the modulated PRBS data has a varying amplitude.

7. The apparatus of claim 6, wherein:
 the amplitude of the modulated PRBS data varies from a first amplitude value to a second amplitude value;
 the processing system is configured to generate indicators indicating the first and second amplitude values; and
 the interface is configured to output the indicators for transmission to the wireless node.

8. The apparatus of claim 1, wherein:
 the at least one component includes a pre-distorter configured to pre-distort a signal; and
 the processing system is configured to tune the pre-distorter based on the feedback message.

9. The apparatus of claim 1, wherein:
 the at least one component includes at least one filter configured to perform a non-linear phase operation on a signal to be outputted for transmission to the wireless node; and
 the processing system is configured to tune the at least one filter based on the non-linear distortion.

10. The apparatus of claim 1, wherein the at least one training signal comprises a plurality of training signals, and each of the plurality of training signals has approximately a same duration.

11. A wireless node for wireless communications, comprising:
 a processing system configured to generate at least one training signal;
 an interface configured to output the at least one training signal for transmission to a second wireless node, and to receive a feedback message from the second wireless node, the feedback message providing feedback of the at least one training signal received at the second wireless node based on measurements of the at least one training signal in the second wireless node; and
 at least one component;
 wherein the processing system is further configured to:
  determine a non-linear distortion in the at least one training signal received at the wireless node, said determination being based on the feedback message, the non-linear distortion arising, in part, due to the operation of one or more components in the wireless node; and
  tune at least one component of the one or more components in the wireless node based on the determined non-linear distortion in order to reduce the non-linear distortion in the wireless node.

12. An apparatus for wireless communications, comprising:
 an interface configured to receive at least one training signal; and
 a processing system configured to determine a non-linear distortion in the received at least one training signal based on knowledge related to the at least one training signal, and to tune at least one component in the apparatus based on the determined non-linear distortion in order to reduce the non-linear distortion in the apparatus;

wherein the determined non-linear distortion in the received at least one training signal is non-linear distortion arising, in part, due to the operation of one or more components in a device transmitting the at least one training signal.

13. The apparatus of claim 12, wherein:

the processing system is configured to generate a request for the at least one training signal; and the interface is configured to output the request for transmission, wherein transmission of the request occurs before the reception of the at least one training signal.

14. The apparatus of claim 13, wherein the request includes one or more indicators indicating at least one of a number of the at least one training signal, a type of the at least one training signal, a duration of the at least one training signal, or one or more parameters of the at least one training signal.

15. The apparatus of claim 12, wherein the processing system is configured to compare the received at least one training signal with at least one known training signal, and to determine the non-linear distortion in the received at least one training signal based on the comparison.

16. The apparatus of claim 15, wherein the at least one training signal includes at least one of modulated pseudo-random binary sequence (PRBS) data, a Gaussian signal, or a chirp signal.

17. The apparatus of claim 16, wherein the modulated PRBS data has a varying amplitude, and the processing system is configured to determine the non-linear distortion over an amplitude range based on the varying amplitude.

18. The apparatus of claim 12, wherein:

the at least one component includes at least one filter configured to perform a non-linear phase operation on another signal; and the processing system is configured to tune the at least one filter based on the determined non-linear distortion.

19. The apparatus of claim 12, further comprising at least one antenna via which the at least one training signal is received, wherein the apparatus is configured as a wireless node.

* * * * *